Patented June 27, 1939

2,163,819

UNITED STATES PATENT OFFICE 2,163,819

PROCESS OF PRODUCING MAGNESIUM OXYCHLORIDE

Fritz Wienert, Stassfurt, Germany, assignor, by mesne assignments, to Magnesium Development Corporation, a corporation of Delaware No Drawing. Application December 18, 1936, Serial No. 116,651. In Germany January 4, 1936

4 Claims. (Cl. 23—91)

The present invention relates to improvements in the production of magnesium compounds, and more particularly, of magnesium oxychloride.

Magnesium oxychloride from which magnesia and hydrochloric acid are obtainable, by known methods, by treatment with steam, or magnesia and chlorine are obtainable, by heating in a current of air, has hitherto usually been produced by introducing magnesia into an aqueous solution of magnesium chloride, or into the fused higher hydrates of that salt, and stirring the mixture until it solidifies. In the production of such mixtures, the mass, which is originally pulpy adheres firmly to all parts of the mixer, and since these incrustations immediately set to a mass as hard as cement, their removal is attended with considerable difficulty and greatly impedes operations. If, on the other hand, the magnesium oxychloride is intended to be employed in granular or powder form, the product must first be dried, in order to prevent it from clogging the crushing apparatus, and even then additional expense is incurred in breaking down the stonelike final product.

The present invention aims at obtaining magnesium oxychloride directly in the form of powder, without any clogging of the mixer and subsequent incrustation.

The invention is based on the observation that when an intimate mixture of powdered calcined magnesia and ground solid hydrated magnesium chloride is gradually heated to about the melting point of the latter, a reaction occurs between the components of the mixture, without any fusion of the hydrated magnesium chloride being perceptible. If the quiescent product be heated, a slight fritting of the mass is observable, without leading to caking. The reaction is complete within a few minutes.

In accordance with the present invention therefore, in order to produce a dry, pulverulent magnesium oxychloride, of any convenient composition and suitable for chemical reactions, a mixture, in suitable proportions, of powdered magnesia and ground, solid hydrates of magnesium chloride is heated to the vicinity of the fusing point of the hydrate in question. Care should be taken, however, to avoid a too rapid supply of heat to the reaction mixture such as would cause an extensive melting of the magnesium chloride hydrate contained therein, and would in turn result in the formation of lumps and an incomplete reaction.

The reaction is preferably carried out in a rotary tube furnace through which the pulverulent mixture is passed in counterflow to the flame gases. The product then forms a fine powder, which can be employed in any convenient manner. For example, it can be moistened with water or saline solutions (such as magnesium chloride solution) and pressed into shaped bodies. The reaction may, however, also be combined with the shaping operation, by pressing the mixture of magnesium oxide and extremely fine hydrated magnesium chloride in moulds and slowly raising the moulded bodies to the reaction temperature, it being advisable to avoid any movement of said bodies until the reaction has been completed in the outer portions of same.

When hydrated magnesium chloride, containing an amount of water corresponding approximately to the condition of hexahydrate, is employed, a reaction temperature of about 130–150° C. has been found suitable. On the other hand, the lower hydrates require correspondingly higher temperatures. Since, in the case of direct heating by means of flame gases, water is evaporated—and the reaction temperature would therefore increase, as the result of the progressive dehydration—indirect heating, for example in an externally heated, closed rotary tube furnace, in which no expulsion of steam can occur, is preferable when lower hydrates are used.

Calcined magnesia may be wholly or partially replaced by magnesium hydroxide or basic magnesium oxychloride, provided the latter be still capable of taking up magnesium chloride.

The preferred method of testing the completeness of the reaction consists in quickly heating a sample of the product. If no fusion or sintering can be detected, magnesium oxychloride is present, whereas the simple mixture of the raw materials is fusible.

Example I

A dry mixture of 55 parts of ground magnesium chloride hexahydrate and 22 parts of powdered magnesia is heated, in an internally heated rotary furnace, with flame gases passing in countercurrent thereto so that the product is discharged at a temperature of 130° C. Said product is an infusible powder of basic magnesium oxychloride, containing 29.6% of magnesium oxide and 37.0% of magnesium chloride, the rest being water.

Example II 100 parts of ground hydrated magnesium chloride, containing slightly less water than the hexahydrate, are mixed with 20 parts of magnesia, moistened with 8 parts of magnesium chloride solution of specific gravity 1.3, and pressed into cylindrical blocks which are heated to 140° C. in 25 minutes, in a tunnel furnace, and then consist of oxychloride containing 21% of magnesium oxide and 40% of magnesium chloride, the rest being water.

Example III

A mixture of 50 parts of ground magnesium chloride tetrahydrate and 27 parts of magnesium hydroxide is heated, under counterflow conditions, in the rotary furnace, in such a manner that the product leaves the furnace with a temperature of about 140° C., its condition being that of a pulverulent oxychloride containing 28% of magnesium oxide and 42% of magnesium chloride, the rest being water.

Example IV 100 parts of pulverulent basic magnesium oxychloride, produced as set forth in Example I and containing about 29% of magnesium oxide and 37% of magnesium chloride, are mixed with 80 parts of ground magnesium chloride hexahydrate and raised to a temperature of 140° C. in an externally heated rotary furnace. The resulting oxychloride contains about 16% of magnesium oxide and 43% of magnesium chloride, the rest water.

I claim:

1. A process of producing magnesium oxychloride, in which a mixture of a substance of the group consisting of calcined magnesia, dry magnesium hydroxide and dry basic magnesium oxychloride, and a solid hydrate of magnesium chloride, in proportions adapted to yield magnesium oxychloride of the desired composition, is gradually supplied with heat from an external source without grinding during the reaction so as to maintain said mixture at temperatures in the vicinity of, but not substantially above, the fusion point of said magnesium chloride hydrate, while avoiding extensive melting thereof.

2. A process of producing magnesium oxychloride, in which a mixture of a substance of the group consisting of calcined magnesia, dry magnesium hydroxide and dry basic magnesium oxychloride, and a solid hydrate of magnesium chloride, both in the form of a powder and in proportions adapted to yield magnesium oxychloride of the desired composition, is, while being continuously stirred, gradually supplied with heat from an external source without grinding during the reaction so as to maintain said mixture at temperatures in the vicinity of, but not substantially above, the fusion point of said magnesium chloride hydrate, while avoiding extensive melting thereof.

3. A process of producing magnesium oxychloride, in which a mixture of a substance of the group consisting of calcined magnesia, dry magnesium hydroxide and dry basic magnesium oxychloride, and a solid hydrate of magnesium chloride, in proportions adapted to yield magnesium oxychloride of the desired composition, said mixture also including a binding medium, is compressed into moulded bodies, such bodies then being gradually supplied with heat from an external source so as to maintain said mixture at temperatures in the vicinity of, but not substantially above, the fusion point of said magnesium chloride hydrate, while avoiding extensive melting thereof.

4. A process of producing magnesium oxychloride, in which a mixture of a substance of the group consisting of calcined magnesia, dry magnesium hydroxide and dry basic magnesium oxychloride, and a solid hydrate of magnesium chloride, in proportions adapted to yield magnesium oxychloride of the desired composition, said mixture also including as a binding medium magnesium chloride liquor, is compressed into moulded bodies, such bodies then being gradually supplied with heat from an external source so as to maintain said mixture at temperatures in the vicinity of, but not substantially above, the fusion point of said magnesium chloride hydrate, while avoiding extensive melting thereof.

FRITZ WIENERT.